March 7, 1944.  F. N. BARD ET AL  2,343,491
SWIVEL JOINT
Filed April 30, 1942  3 Sheets-Sheet 1
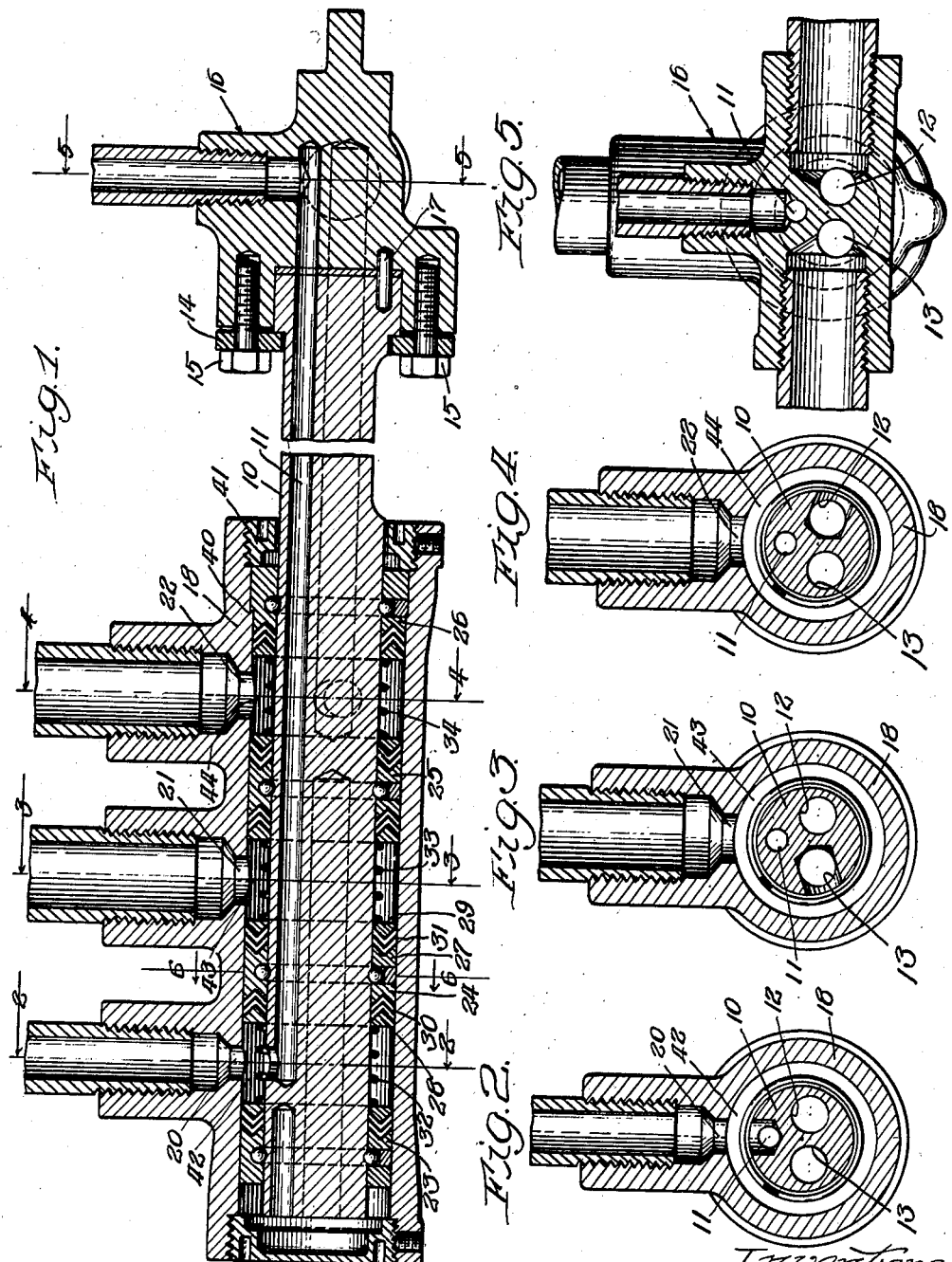
Inventors:
Francis N. Bard,
Victor W. Breitenstein,
Charles J. Oldo
Lawrence A. Wray,
By Christon, Wiles, Davies, Hindle Attys.

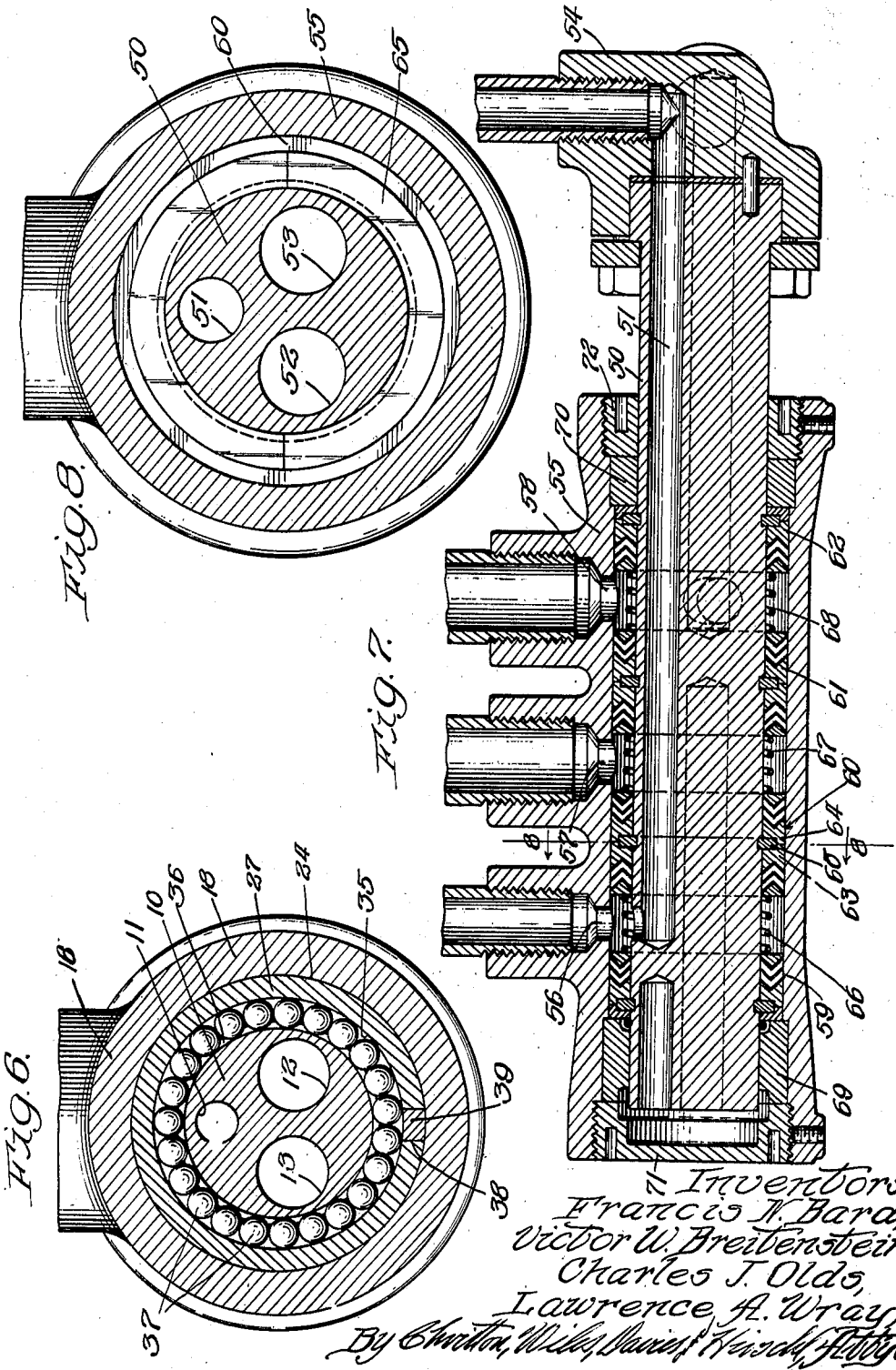

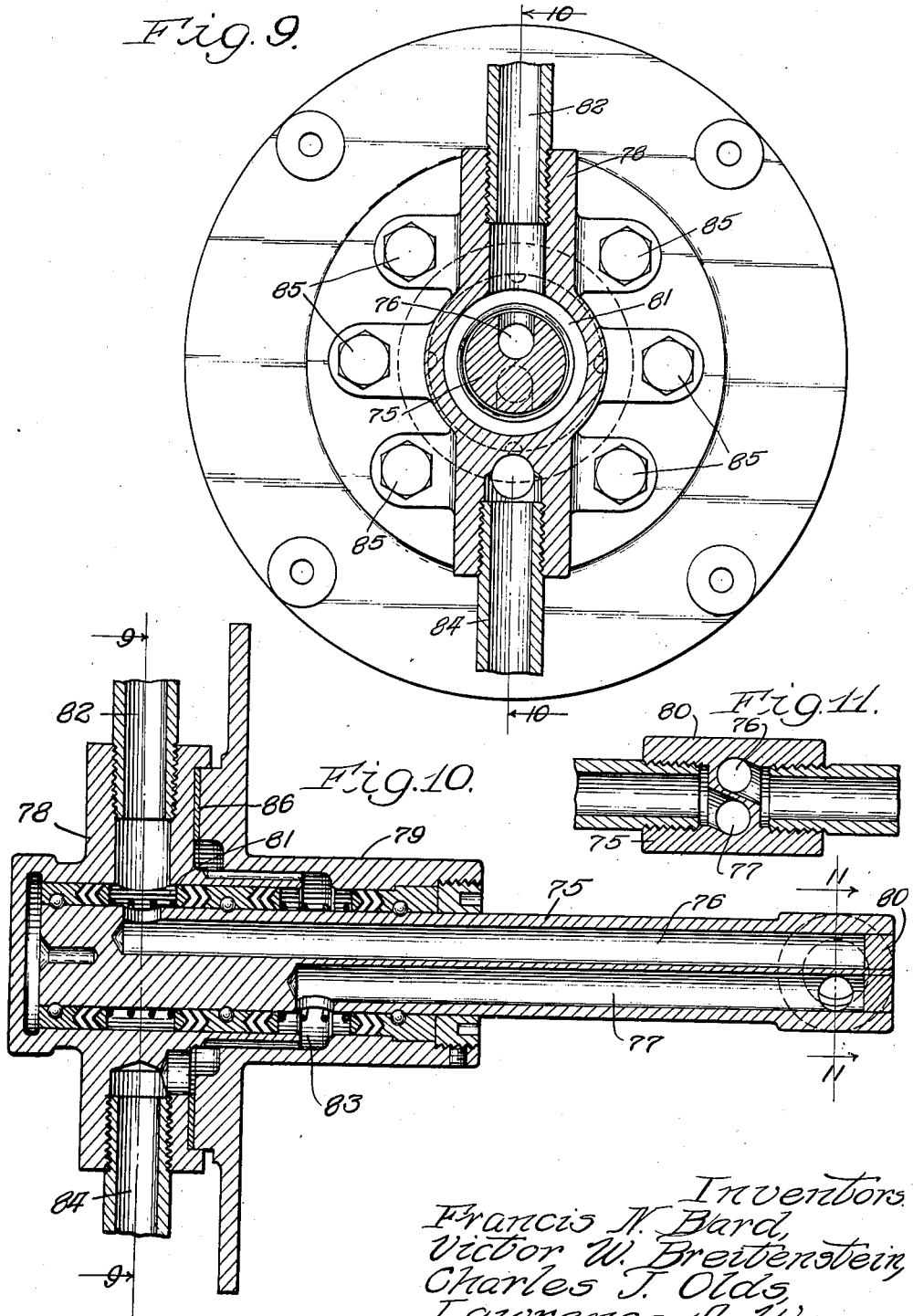

Patented Mar. 7, 1944

2,343,491

UNITED STATES PATENT OFFICE 2,343,491

SWIVEL JOINT

Francis N. Bard, Highland Park, and Victor W. Breitenstein, Charles J. Olds, and Lawrence A. Wray, Chicago, Ill.; said Breitenstein, said Olds, and said Wray, assignors to said Bard Application April 30, 1942, Serial No. 441,074

6 Claims. (Cl. 285—97.3)

This invention relates to a swivel joint, and more particularly to a swivel joint providing a plurality of fluid paths.

One feature of this invention is that it provides an improved swivel joint; another feature of this invention is that a joint of the character here disclosed may be readily assembled, yet there is provision for maintaining separating elements in their proper positions between various fluid passageways; yet another feature of this invention is that a joint of this kind is much more readily swivelable, even under high pressure differential between the passageways, than previous joints designed for similar purposes; a further feature of this invention is that rotation is concentrated at the point of minimum radius and friction is reduced by ball bearings which also serve to lock packing elements in place on one portion of the joint; other features and advantages of this invention will be apparent from the following specification and the drawings, in which:

Figure 1 is a longitudinal sectional view of a joint embodying a preferred form of our invention; Figure 2 is a transverse sectional view along the line 2—2 of Figure 1; Figure 3 is a similar view along the line 3—3 of Figure 1; Figure 4 is another transverse sectional view along the line 4—4 of Figure 1; Figure 5 is a sectional view of the T-head, along the line 5—5 of Figure 1; Figure 6 is a sectional view along the line 6—6 of Figure 1; Figure 7 is a sectional view of another embodiment of our invention; Figure 8 is a transverse sectional view along the line 8—8 of Figure 7; Figure 9 is a transverse sectional view of another form of joint; Figure 10 is a longitudinal sectional view of the same joint; and Figure 11 is a transverse sectional view along the line 11—11 of Figure 10.

There are many cases where it is desirable to provide a plurality of separate fluid paths through a single swivel joint, one example of a joint providing two separate fluid paths being that described and claimed in Bard application, Serial No. 376,903, which issued as Patent No. 2,293,585. Under some circumstances, however, it is desirable to provide three or more paths, one use of a joint with three or more separate fluid paths being in connection with the turrets of a modern bomber. Swivel joints heretofore used for such work have been open to various objections, one of the principal ones being that, where a single shaft member was used for all of the passageways the packing elements separating various annular passageways were sometimes displaced longitudinally along the shaft to such an extent as to close or practically close one of the passageways. Such displacement took place, of course, because of the existence of a pressure differential between two adjacent passageways, this differential sometimes running as high as fifteen hundred pounds to the square inch, and frequently exceeding five hundred pounds to the square inch.

The reason for partial or complete choking of the fluid flow at times was not heretofore appreciated, and we have both recognized the problem and provided an effective solution for it. We have done this by providing the inner surface of the packing elements (more properly speaking, the retainers associated with the packings) with annular grooves, by providing the shaft member with registering annular grooves, and by placing some form of locking means in these grooves, as balls or a split ring. Preferably, a plurality of balls are used in the grooves; but in any event displacement of the packing elements is positively and definitely prevented.

In the particular embodiment of our invention illustrated in Figures 1 to 6, the swivel joint is shown as comprising three principal parts. One of these is a metal shaft member 10 having three longitudinal passageways drilled therealong, these passageways being here identified as 11, 12 and 13. At one end the shaft member has rigidly fastened to it, as by a plate member 14 and studs 15, a connecting head 16 which is generally termed a T-head because the connections are arranged in that shape, as may be best seen in Figure 5. Proper registry of the connecting head is assured by any convenient means, as the pin 17.

The other end of the shaft member 10 is received by and rotatable within a casing member 18. As may be best seen in Figure 1, the casing member has a cylindrical inner surface through which openings 20, 21 and 22 communicate to its interior at points spaced longitudinally or axially of the casing. While these are shown in one plane for convenience of illustration, it will be understood that they can equally well be in different planes radially of the casing. As is readily apparent from the drawings, the shaft member 10 is provided with a cylindrical external surface, and this is of a lesser diameter than the internal surface of the casing member, so that there is a space enabling the introduction of divider or sealing elements between these members. For convenience of description the sealing elements will for the most part be considered as unitary elements and are here identified as 23, 24, 25 and 26. Actually, however, these elements consist of metal retaining portions, as the center portion 27 and end portions 28 and 29, and packing or sealing portions of appropriate gasket material, as the portions identified as 30 and 31 in connection with the packing element 24. These sealing portions preferably comprise chevron-like gaskets arranged back to back, so that the open ends of the chevrons face out on each side of the packing element.

Springs 32, 33 and 34 are provided in the annular spaces between the sealing elements, but in the swivel joint here disclosed these springs serve only to hold the retaining and gasket portions tightly against the center portions of the various sealing elements. The divider or sealing elements are positively maintained in desired position along the shaft member by arrangements which amount to two-way thrust bearings. The main portion of each of the elements 23, 24, 25 and 26 is provided on its inner surface with a groove, as the groove 35 in the element 24; and the shaft member is provided with registering grooves, as the groove 36, reference being had particularly to Figure 6. These registering grooves provide a run-way for balls 37 which may be readily placed in the grooves through an opening 38 subsequently closed by a plug of any convenient material, as the rawhide plug 39. The metal of the retaining element and of the shaft is preferably hard, as for example stainless steel, and the cooperation between the balls and the shoulders or edges of the grooves permits ready rotation between the shaft member and sealing elements regardless of the presence of heavy pressure to one side or the other of a sealing element. In order to properly locate the sealing elements and to maintain the shaft member in its desired position within the casing member, the end sealing element 26 is provided with a shoulder 40 cooperating with a similar shoulder in the casing member, so that this sealing element is locked in place in the casing by the annular threaded member 41. This serves to maintain the desired relationship between the shaft member and the casing member, and the other sealing elements are held in the proper positions by being locked against displacement along the shaft member.

It will thus be seen that spaces or annular passageways, here identified as 42, 43 and 44, are provided between the various sealing elements, in each case communicating with one of the openings 20, 21 and 22. The longitudinal passageways 11, 12 and 13 in the shaft member terminate at various points along the axis of the shaft and open to the surface of the shaft member in registry with the annular passageways 42, 43 and 44, as may be best seen in Figures 2, 3 and 4. Fluid of any kind may thus flow through the connections in the T-head, the various passageways, and out through the openings 20, 21 and 22 regardless of relative rotation between the shaft member and casing. It will be understood that the flow may be in either direction in these fluid paths; and that there may be flow in some paths and none in others, equal pressures in the various paths, or high pressures in one or more paths and low pressures in another. In any and all cases fluid is conducted through the paths without leakage or loss of any kind; friction is reduced to a minimum; and there is no chance of displacement of the sealing elements and throttling or choking off of the flow.

In the modification of our invention shown in Figures 7 and 8 the shaft member 50 is again provided with a plurality of longitudinal passageways identified as 51, 52 and 53 which terminate at spaced points along the shaft member, opening out to its cylindrical surface, connection to one end of the passageways again being made through a T-head here identified as 54. As before, the shaft member 50 is rotatable within but somewhat spaced from the inner cylindrical surface of a casing member 55 provided with openings 56, 57 and 58, these again being in registry respectively with the openings of the three passageways in the shaft member. "Registry," in the sense in which it is used here, of course means in the same transverse plane, since rotation of the joint parts with respect to each other may throw the openings out of registry with each other in the absolute sense of the word. The space between the surface of the shaft member and the inner surface of the casing member is again divided into three annular passageways by the divider or sealing elements 59, 60, 61 and 62. In this form of the device the center retaining portions of the sealing elements are divided in two to provide separate parts, as the parts 63 and 64 of the sealing element identified in general as 60. These parts are cut away to provide a central groove in the inner surface of the retaining element, and the shaft member is again provided with annular grooves in registry with the grooves of the respective elements. In this case, however, locking against displacement is effected by a split ring 65. While not as desirable from the standpoint of reducing friction, this form of our invention also locks the sealing elements against displacement along the shaft member.

The various parts of the respective packing elements are held in desired relation to each other, as before, by springs here identified as 66, 67 and 68. In this form of our device the shaft is swivelably locked in the casing by abutment of the end sealing elements 59 and 62 against members 69 and 70 held in place against shoulders in the casing member by threaded cap members 71 and 72.

Another form of joint also embodying our invention is shown in Figures 9, 10 and 11. This joint is similar to those heretofore described in so far as the arrangement of the sealing elements and the provision of separate flow paths are concerned. The principal feature of this modification of our invention lies in a casing transversely separated into two parts. This enables convenient assembly of the joint, provision of practically any desired kind of flanges for mechanical connection to other apparatus, and enables the two flow paths to be readily brought out in the same plane with a minimum of difficulty in the manufacture of the casing.

In this form of our invention the shaft 75, with its two differently terminating longitudinal passageways 76 and 77, is swivelably retained in a casing which comprises two principal parts here identified as 78 and 79. The inlet to the joint passageways is provided by a T-head 80, as before; the passageway 76 opens out into the annular space 81 and thus into the pipe 82; and the other passageway 77 opens into an annular passageway 83 formed between the two casing parts and making connection with the pipe 84. While these are spoken of as inlet and outlet connections, it will again be understood that flow may be in either direction.

In assembling this form of our joint the sealing elements may be locked in place on the shaft by balls, in accordance with the arrangement previously described, and then the casing portion 79 pulled up into engagement with the other portion of the casing and the two locked together, as by the studs 85. A fluid-tight seal is achieved, in accordance with conventional practice, by a packing or gasket 86.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. A swivel joint providing a plurality of fluid paths therethrough, including: a casing member having a cylindrical inner surface; a shaft member rotatable within the casing member, having a cylindrical outer surface spaced from that of the casing member, and having at least two longitudinal passageways therethrough, such passageways opening to the surface of the shaft member at spaced points therealong and the casing member having openings therein at corresponding points; sealing elements encircling the shaft member between said points and movably engaging each of said surfaces, at least one sealing element having an annular groove therein and one of the associated members having a registering annular groove; and means in such pair of registering grooves for preventing longitudinal movement of the sealing element.

2. Apparatus of the character claimed in claim 1, including means for preventing relative longitudinal movement between the shaft and casing members while permitting rotation therebetween.

3. A swivel joint providing a plurality of fluid paths therethrough, including: a casing member having a cylindrical inner surface; a shaft member rotatable within the casing member, having a cylindrical outer surface spaced from that of the casing member, and having at least two longitudinal passageways therethrough, such passageways opening to the surface of the shaft member at spaced points therealong and the casing member having openings therein at corresponding points; sealing elements encircling the shaft member betwen said points and movably engaging each of said surfaces, at least one sealing element having an annular groove therein and one of the associated members having a registering annular groove; and means in such pair of registering grooves for preventing longitudinal movement of the sealing element, such means comprising balls facilitating rotation between the sealing element and one of said members.

4. Apparatus of the character claimed in claim 3, including means for preventing relative longitudinal movement between the shaft and casing members while permitting rotation therebetween.

5. A swivel joint providing a plurality of fluid paths therethrough, including: a casing member having a cylindrical inner surface; a shaft member rotatable within the casing member, having a cylindrical outer surface spaced from that of the casing member, and having at least two longitudinal passageways therethrough, such passageways opening to the surface of the shaft member at spaced points therealong and the casing member having openings therein at corresponding points; sealing elements encircling the shaft member between said points and movably engaging each of said surfaces, at least one sealing element having an annular inner groove and the shaft member having a registering annular groove in the outer surface thereof; and means in such pair of registering grooves for preventing longitudinal movement of the sealing element along the shaft member, such means comprising balls facilitating rotation between the shaft member and sealing element.

6. A swivel joint providing a plurality of fluid paths therethrough, including: a casing member having a cylindrical inner surface; a shaft member rotatable within the casing member, having a cylindrical outer surface spaced from that of the casing member, and having three longitudinal passageways therethrough, such passageways opening to the surface of the shaft member at spaced points therealong and the casing member having openings therein at corresponding points; sealing elements encircling the shaft member between said points and movably engaging each of said surfaces, at least two of the sealing elements having annular inner grooves therein and the shaft member having registering annular grooves in the outer surface thereof; and means in each such pair of registering grooves for preventing longitudinal movement of the sealing element along the shaft member, such means comprising balls facilitating rotation between the shaft member and the sealing element.

FRANCIS N. BARD.
VICTOR W. BREITENSTEIN.
CHARLES J. OLDS.
LAWRENCE A. WRAY.